US011006094B2

(12) United States Patent
Wu et al.

(10) Patent No.: US 11,006,094 B2
(45) Date of Patent: May 11, 2021

(54) DEPTH SENSING APPARATUS AND OPERATION METHOD THEREOF (71) Applicant: HIMAX TECHNOLOGIES LIMITED, Tainan (TW)

(72) Inventors: Biing-Seng Wu, Tainan (TW); Yi-Nung Liu, Tainan (TW); Chin-Jung Tsai, Tainan (TW); Cheng-Hung Chi, Tainan (TW); Han-Yi Kuo, Tainan (TW); Kuan-Ming Chen, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/053,760

(22) Filed: Aug. 2, 2018

(65) Prior Publication Data

US 2020/0045296 A1 Feb. 6, 2020

(51) Int. Cl.
*H04N 13/271* (2018.01)
*G06T 7/55* (2017.01)
*G06T 7/521* (2017.01)
*H04N 13/254* (2018.01)

(52) U.S. Cl.
CPC ........... *H04N 13/271* (2018.05); *G06T 7/521* (2017.01); *G06T 7/55* (2017.01); *H04N 13/254* (2018.05); *G06T 2207/10028* (2013.01)

(58) Field of Classification Search
CPC ...... H04N 13/271; H04N 13/254; G06T 7/55; G06T 7/521; G06T 2207/10028
USPC ....................................................... 348/136
See application file for complete search history.

(56) References Cited

U.S. PATENT DOCUMENTS

| 9,325,973 | B1* | 4/2016 | Hazeghi | G06T 7/521 |
| 9,826,216 | B1* | 11/2017 | Hazeghi | G02B 27/30 |
| 2004/0125205 | A1* | 7/2004 | Geng | G01B 11/2509 |
| | | | | 348/142 |
| 2009/0316995 | A1* | 12/2009 | Szeliski | G06T 5/003 |
| | | | | 382/199 |
| 2015/0371434 | A1* | 12/2015 | Nash | G06K 9/2036 |
| | | | | 359/558 |
| 2016/0048016 | A1 | 2/2016 | Crane et al. | |

(Continued)

FOREIGN PATENT DOCUMENTS

| TW | 201836352 | 10/2018 |
| TW | 201926241 | 7/2019 |

OTHER PUBLICATIONS

"Office Action of Taiwan Counterpart Application," dated Sep. 19, 2019, p. 1-p. 7.

*Primary Examiner* — John W Miller
*Assistant Examiner* — Omer Khalid
(74) *Attorney, Agent, or Firm* — JCIPRNET (57) ABSTRACT

A depth sensing apparatus and an operation method thereof are provided. The depth sensing apparatus includes a projector, multiple cameras, and an image processing circuit. The projector includes a diffraction optical element (DoE) and a light source module. Rays of the light source module selectively pass through at least one of multiple projection style regions of the DoE so as to generate a projection pattern, and the projection pattern is projected to a field. The cameras respectively shoot the projection pattern projected to the field to obtain multiple images. The image processing circuit processes the images to obtain multiple depth maps. The image processing circuit at least merges the depth maps to generate a final depth map of the field.

7 Claims, 6 Drawing Sheets

(56) References Cited

U.S. PATENT DOCUMENTS

2018/0139431 A1\* 5/2018 Simek ................. H04N 13/232
2018/0246398 A1\* 8/2018 Shishido ............ G03B 21/2053
2019/0246091 A1\* 8/2019 Bikumandla ........ H04N 5/2259

\* cited by examiner

DEPTH SENSING APPARATUS AND OPERATION METHOD THEREOF

BACKGROUND OF THE INVENTION

1. Field of the Invention

The invention relates to a sensing apparatus, and particularly relates to a depth sensing apparatus and an operation method of the depth sensing apparatus.

2. Description of Related Art

In general, three-dimensional depth sensing can be carried out by obtaining depth information of an object to be sensed by using a light projector together with a light receiver. The conventional light projector has a fixed and single projection style. In other words, the conventional light projector is only able to project light in a fixed projection style to a field. Different projection styles have different properties, and are therefore suitable for different applications. For example, a texture-type projector is suitable for a coded light stereo application, the large number of dot patterns projected by a dot-type projector is suitable for a structured light application, a diffuser (or flash)-type projector is suitable for a 2D image capture application or an active stereo application, and a single dot pattern (or a small number of dot patterns) projected by a ray-type projector is suitable for an application of a rangefinder. Since the conventional light projector is only able to project light in a single projection style, the applicability of the conventional light projector is confined.

SUMMARY OF THE INVENTION

One or some exemplary embodiments of the invention provide a depth sensing apparatus and an operation method of the depth sensing apparatus, where the same projector selectively provides projection patterns of different projection styles, so as to be adaptable to different applications.

An embodiment of the invention provides a depth sensing apparatus. The depth sensing apparatus includes a projector, a first camera, a second camera, and an image processing circuit. The projector includes a diffraction optical element (DoE) and a light source module. The diffraction optical element includes a plurality of projection style regions. Rays of the light source module selectively pass through at least one of the projection style regions to generate a projection pattern, and the projection pattern is projected to a field. A first camera shoots the projection pattern projected to the field to obtain a first image. A second camera shoots the projection pattern projected to the field to obtain a second image. The image processing circuit is coupled to the projector, the first camera, and the second camera. The image processing circuit processes the first image to obtain a first depth map. The image processing circuit processes the second image to obtain a second depth map. The image processing circuit at least merges the first depth map and the second depth map to generate a final depth map of the field.

An embodiment of the invention provides an operation method of a depth sensing apparatus. The operation method includes the following. A projection pattern is projected to a field by a projector. The projection pattern projected to the field is shot by a first camera to obtain a first image. The projection pattern projected to the field is shot by a second camera to obtain a second image. The first image is processed by an image processing circuit to obtain a first depth map. The second image is processed by the image processing circuit to obtain a second depth map. The first depth map and the second depth map is at least merged by the image processing circuit to generate a final depth map of the field.

Based on the above, the diffraction optical element of the projector includes multiple projection style regions, and the rays of the light source module may selectively pass through one or more of the projection style regions and generate the projection pattern PP. In other words, the same projector may selectively provide projection patterns of different projection styles, so as to be adaptable to different applications. Therefore, the depth sensing apparatus of the embodiments of the invention can selectively provide projection patterns of different projection styles based on different applications.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Throughout the specification (including claims), the term "couple" (or "connect") refers to any direct or indirect connection means. For example, if it is described that a first device is coupled to (or connected to) a second device, it shall be interpreted that the first device may be directly connected to the second device, or the first device may be indirectly connected to the second device through another device or some connection means. In addition, whenever possible, identical or similar reference numbers stand for identical or similar elements/components/steps in the figures and the embodiments. Elements/components/steps using the same referential numbers or using the same terms in different embodiments may cross-refer related descriptions.

Figure 1:
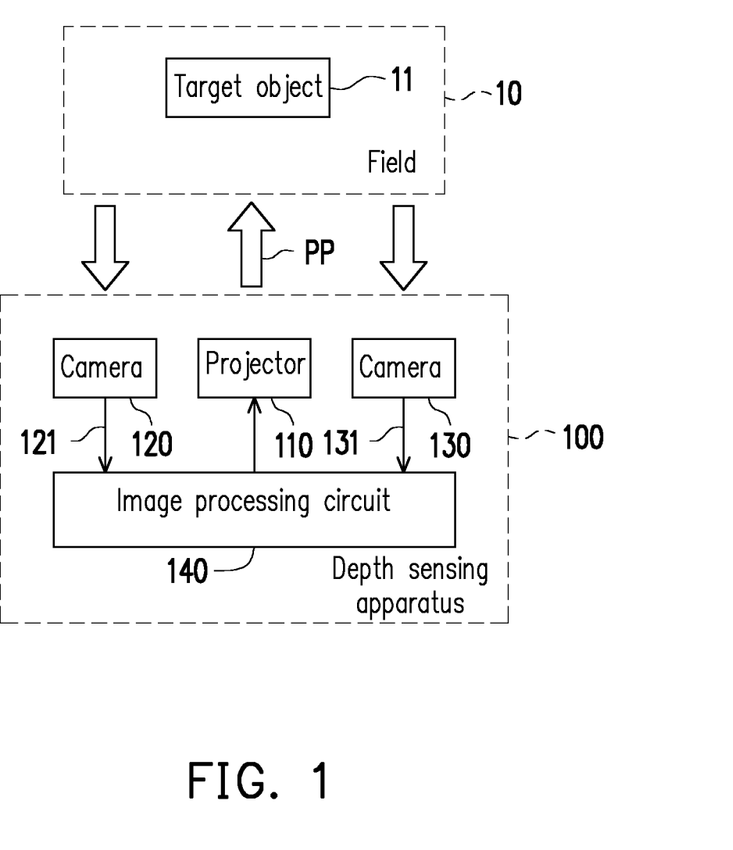
FIG. 1 is a schematic circuit block diagram illustrating a depth sensing apparatus according to an embodiment of the invention.

FIG. 1 is a schematic circuit block diagram illustrating a depth sensing apparatus 100 according to an embodiment of the invention. The depth sensing apparatus 100 includes a projector 110, a camera 120, a camera 130, and an image processing circuit 140. The projector 110 includes a diffraction optical element (DoE) and a light source module. Details of the DoE and the light source module will be described in the following. The DoE of the projector 110 includes a plurality of projection style regions, and rays of the light source module of the projector 110 may selectively pass through one (or more) of the projection style regions to generate a projection pattern PP. The projection pattern PP is projected to a field 10. Based on the actual scenario of application, there may be one or more target objects 11 or no target object 11 in the field 10.

Figure 2:
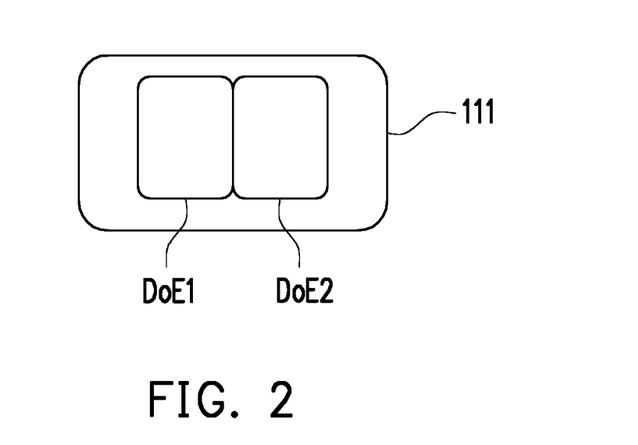
FIGS. 2 to 4 are schematic views illustrating layouts of a diffraction optical element of the projector shown in FIG. 1 according to different embodiments of the invention.
Figure 3:
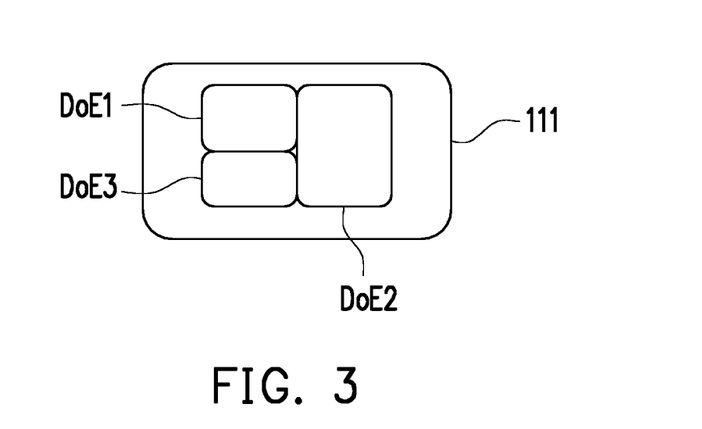
Figure 4:
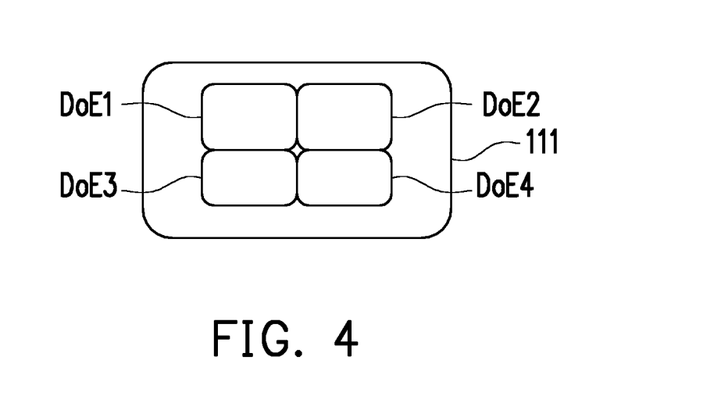

Based on the design needs, the number of the projection style regions may be 2, 3, or more. For example, FIGS. 2 to 4 are schematic views illustrating layouts of a DoE 111 of the projector 110 shown in FIG. 1 according to different embodiments of the invention. FIGS. 2 to 4 are front views illustrating the DoE 111. In the embodiment shown in FIG. 2, the DoE 111 has two projection style regions, which are respectively a projection style region DoE1 and a projection style region DoE2. In the embodiment shown in FIG. 3, the DoE 111 has three projection style regions, which are respectively the projection style region DoE1, the projection style region DoE2, and a projection style region DoE3. In the embodiment shown in FIG. 4, the DoE 111 has four projection style regions, which are respectively the projection style region DoE1, the projection style region DoE2, the projection style region DoE3, and a projection style region DoE4. Based on the design needs, any one of the projection style regions DoE1, DoE2, DoE3, and DoE4 shown in FIGS. 2 to 4 may be a texture-type region, a dot-type region, a diffuser (or flash)-type region, or a ray-type region. The patterns of the texture type, the dot type, the diffuser type, and the ray type are conventional, and will not be reiterated in the following.

According to the design needs, in some embodiments, the projection style regions DoE1, DoE2, DoE3, and DoE4 shown in FIGS. 2 to 4 may have different projection styles. In some other embodiments, some of the projection style regions DoE1, DoE2, DoE3, and DoE4 shown in FIGS. 2 to 4 may have the different projection styles, while some other of the projection style regions DoE1, DoE2, DoE3, and DoE4 have the same projection styles (but different projection patterns). In other embodiments, the projection style regions DoE1, DoE2, DoE3, and DoE4 shown in FIGS. 2 to 4 may have the same projection styles, but have different projection patterns.

Figure 5:
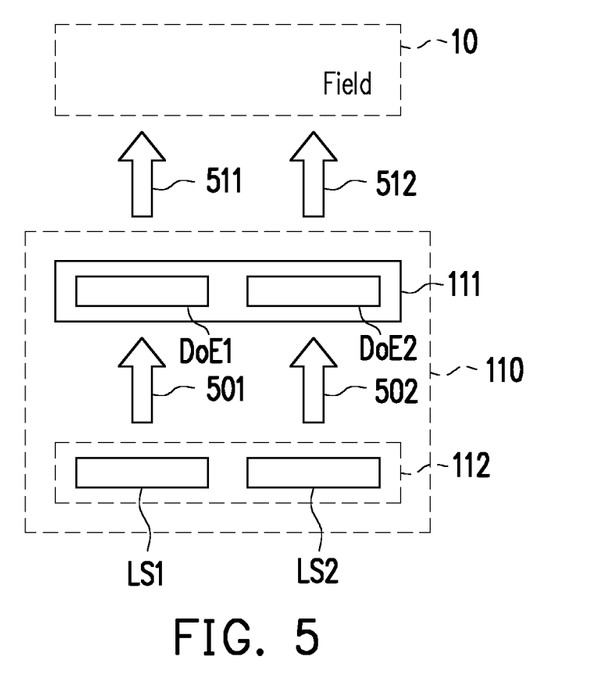
FIG. 5 is a schematic view illustrating the diffraction optical element and a light source module of the projector shown in FIG. 1 according to an embodiment of the invention.

FIG. 5 is a schematic view illustrating the DoE 111 and a light source module 112 of the projector 110 shown in FIG. 1 according to an embodiment of the invention. In the embodiment shown in FIG. 5, the light source module 112 includes a plurality of light sources (e.g., a light source LS1 and a light source LS2 as shown in FIG. 5), and the DoE 111 includes multiple projection style regions (e.g., the projection style region DoE1 and the projection style region DoE2 shown in FIG. 5). Even though FIG. 5 illustrates two light sources and two projection style regions, the projector 110 of other embodiments may have a greater number of light sources and a greater number of projection style regions. The light sources LS1 and LS2 are matched with the projection style regions DoE1 and DoE2 in a one-to-one manner. By selectively lighting up one or more of the light sources, rays of the light source module 112 selectively pass through at least one of the projection style regions.

For example, the light source LS1 may be enabled, and the light source LS2 may be disabled. The enabled light source LS1 may provide a ray 501 to the projection style region DoE1, and the disabled light source LS2 does not provide a ray 502 to the projection style region DoE2. The ray 501 of the light source LS1 may pass through the projection style region DoE1 to generate a projection pattern 511, while a projection pattern 512 is not generated from the projection style region DoE2, as the ray 502 is not provided. Alternatively, the enabled light source LS2 may provide the ray 502, so that the projection style region DoE2 generates the projection pattern 512, while the disabled light source LS1 does not provide the ray 501 so the projection pattern 511 is not generated from the projection style region DoE1. Therefore, the rays of the light source module 112 may selectively pass through one (or more) of the projection style regions DoE1 and DoE2 to generate the projection pattern.

Figure 6:
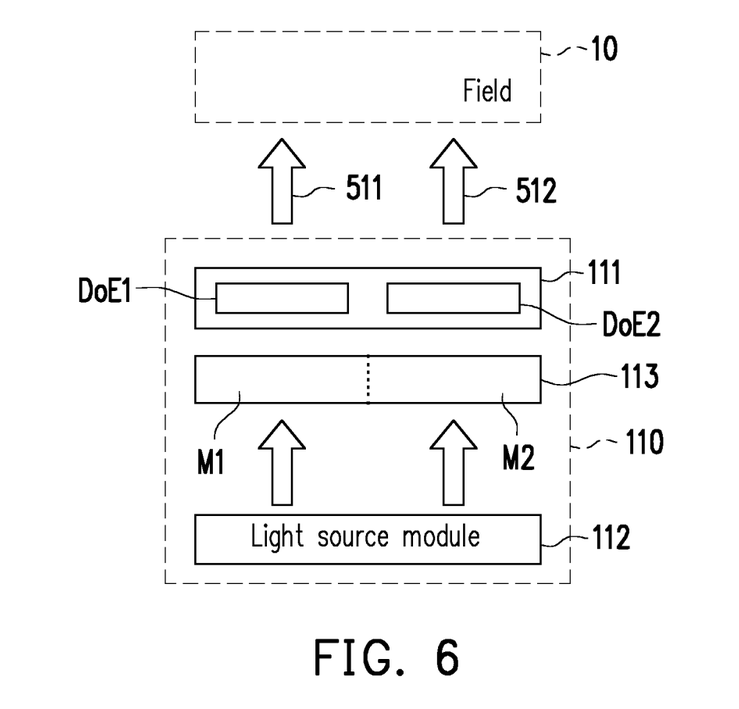
FIG. 6 is a schematic view illustrating the diffraction optical element and a light source module of the projector shown in FIG. 1 according to another embodiment of the invention.

FIG. 6 is a schematic view illustrating the DoE 111 and the light source module 112 of the projector 110 shown in FIG. 1 according to another embodiment of the invention. In the embodiment shown in FIG. 6, the projector 110 includes the DoE 111, the light source module 112, and a dynamic light shielding element 113. In the embodiment shown in FIG. 6, the DoE 111 includes the projection style region DoE1 and the projection style region DoE2. In other embodiments, the DoE 111 may have a greater number of projection style regions. The dynamic light shielding element 113 is disposed between the DoE 111 and the light source module 112. The dynamic light shielding element 113 allows the rays of the light source module 112 to irradiate one or more of the projection style regions DoE1 and DoE2.

According to the design needs, the dynamic light shielding element 113 may include a liquid crystal panel or other light shielding elements. The dynamic light shielding element 113 has a plurality of light shielding regions, such as a light shielding region M1 and a light shielding region M2 shown in FIG. 6. The light shielding regions M1 and M2 may be dynamically and independently switched between a light shielding state and a light guiding state. The light shielding regions M1 and M2 are matched with the projection style regions DoE1 and DoE2 in a one-to-one manner. By selectively switching between the light shielding state and the light guiding state, the dynamic light shielding element 113 allows the rays of the light source module 112 to selectively pass through at least one of the projection style regions DoE1 and DoE2.

For example, the light shielding region M1 may be selectively switched to the light guiding state, and the light shielding region M2 may be selectively switched to the light shielding state. The rays of the light source module 112 may pass through the light shielding region M1 to generate the projection pattern 511 from the projection style region DoE1, while the projection pattern 512 is not generated from the projection style region DoE2 because there is no ray from the light source module 112. Alternatively, the light shielding region M1 may be selectively switched to the light shielding state, and the light shielding region M2 may be selectively switched to the light guiding state. The rays of the light source module 112 may pass through the light shielding region M2 to generate the projection pattern 512 from the projection style region DoE2, while the projection pattern 511 is not generated from the projection style region DoE1 because there is no ray from the light source module 112. Therefore, the rays of the light source module 112 may selectively pass through one (or more) of the projection style regions DoE1 and DoE2 to generate the projection pattern.

Figure 7:
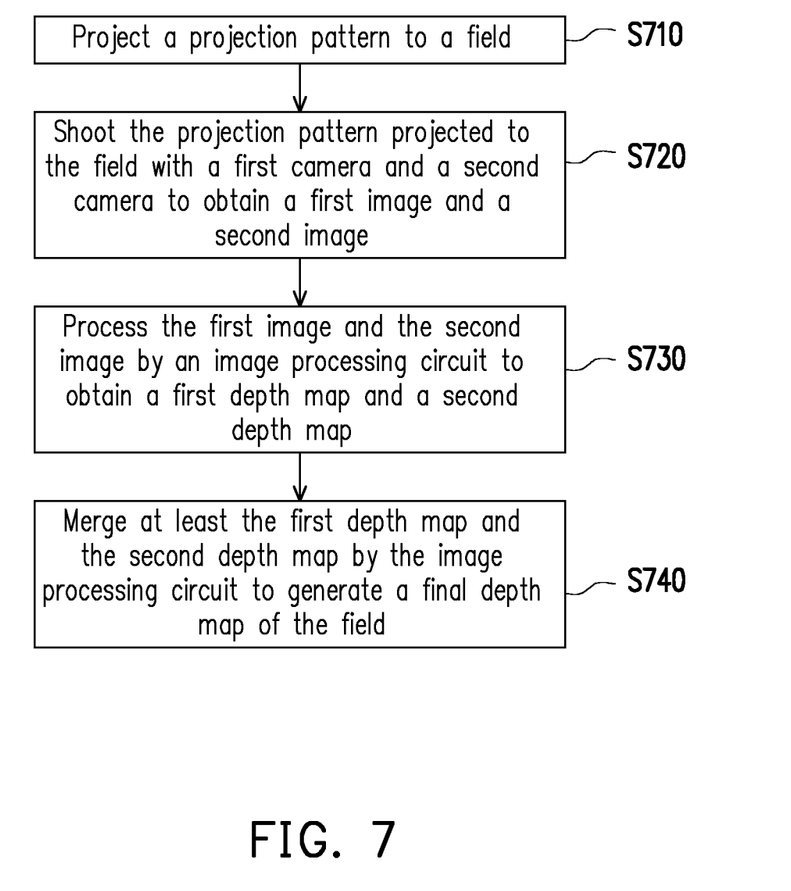
FIG. 7 is a schematic flowchart illustrating an operation method of a depth sensing apparatus according to an embodiment of the invention.

FIG. 7 is a schematic flowchart illustrating an operation method of a depth sensing apparatus according to an embodiment of the invention. Referring to FIGS. 1 and 7, at Step S710, the projector 110 projects the projection pattern PP to the field 10. At Step S720, the camera 120 may shoot the projection pattern PP projected to the field 10 to obtain an image 121, and the camera 130 may shoot the projection pattern PP projected to the field 10 to obtain an image 131. Based on the design needs, one of the camera 120 and the camera 130 has an infrared (IR) image sensor, a red-green-blue (RGB) image sensor, or a time-of-flight (ToF) sensor.

Figure 8:
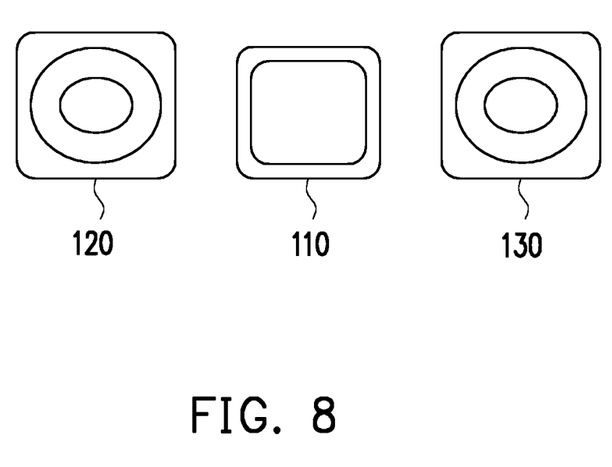
FIGS. 8 and 9 are schematic views illustrating positions where the projector and cameras of the projector shown in FIG. 1 are disposed according to different embodiments of the invention.
Figure 9:
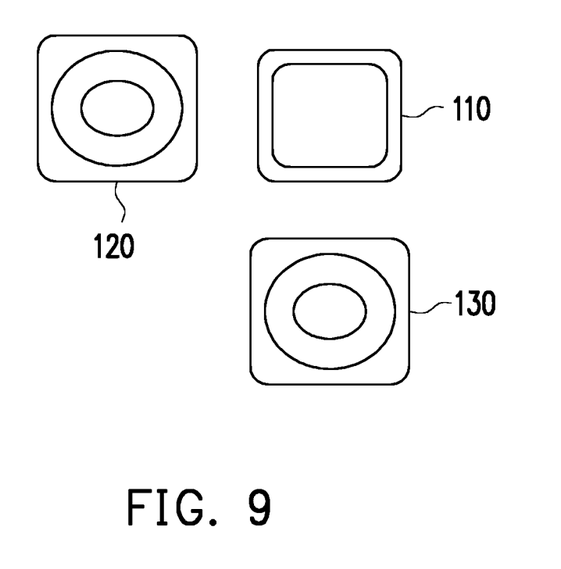

Positions where the projector 110, the camera 120, and the camera 130 are disposed may be determined based on the design needs. For example, FIGS. 8 and 9 are schematic views illustrating the positions where the projector 110, the camera 120, and the camera 130 shown in FIG. 1 are disposed according to different embodiments of the invention. FIGS. 8 to 9 are front views illustrating the projector 110, the camera 120, and the camera 130. In the embodiment shown in FIG. 8, the camera 120 and the camera 130 are symmetrically disposed at opposite two sides of the projector 110. In other embodiments, the camera 120 and the camera 130 may be asymmetrically disposed at opposite two sides of the projector 110. In the embodiment shown in FIG. 9, the camera 120 is disposed at the left side of the projector 110, and the camera 130 is disposed at the lower side of the projector 110. In addition, a distance between the camera 120 and the projector 110 and a distance between the camera 130 and the projector 110 may be determined based on the design needs.

Referring to FIGS. 1 and 7, the image processing circuit 140 is coupled to the projector 110, the camera 120, and the camera 130. Based on the design needs, the image processing circuit 140 may include a central processing unit (CPU), a microprocessor, a digital signal processor (DSP), a programmable controller, an application specific integrated circuit (ASIC), a programmable logic device (PLD), a field programmable gate array (FPGA), or other image processing circuits/elements.

Based on different design needs, relevant functions of the image processing circuit 140 may be implemented in the form of hardware, firmware, and/or software. For example, the relevant functions of the image processing circuit 140 may be implemented in the form of software, firmware, or hardware according to conventional programming languages (e.g., C or C++), hardware description languages (e.g., Verilog HDL or VHDL), or other suitable programming languages. The software (i.e., program) may be read by a computer (or a CPU), and may be recorded in a read-only memory (ROM), a storage device (also referred to as a "recording medium"), and/or a random access memory (RAM). Besides, by reading the program from the recording medium and executing the program by a computer (or a CPU), the relevant functions are achieved. A non-transitory computer readable medium, such as a tape, a disk, a card, a semiconductor memory, a programmable logic circuit, etc., may be adopted as the recording medium. Moreover, the program may be provided to the computer (or the CPU) through an arbitrary transmission medium (e.g., a communication network or broadcasting electronic waves). The communication network is, for example, the Internet, wired communication, wireless communication, or other communication media.

At Step S730, the image processing circuit 140 processes the image 121 to obtain a depth map DM1, and the image processing circuit 140 processes the image 131 to obtain a depth map DM2. At Step S740, the image processing circuit 140 at least merges the depth map DM1 and the depth map DM2 to generate a final depth map FDM of the field 10. The depth map DM1, the depth map DM2, and the final depth map FDM will be described with reference to FIG. 10.

Figure 10:
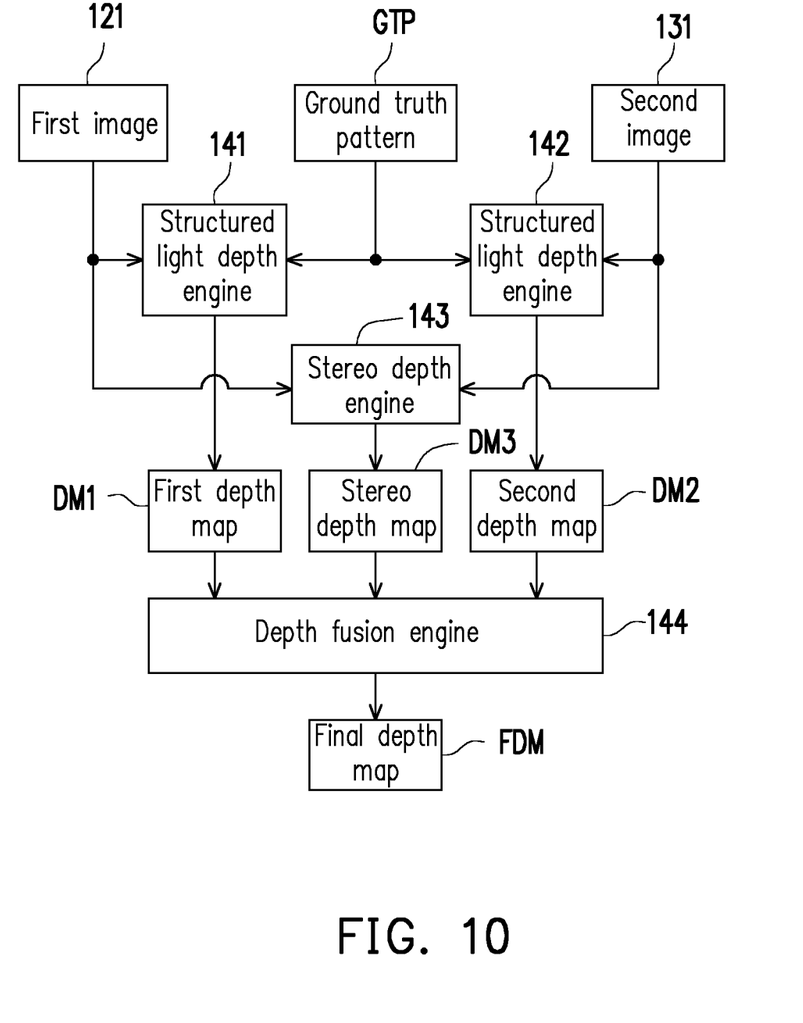
FIG. 10 is a functional block diagram illustrating an image processing circuit shown in FIG. 1 according to an embodiment of the invention.

FIG. 10 is a functional block diagram illustrating the image processing circuit 140 shown in FIG. 1 according to an embodiment of the invention. The image processing circuit 140 shown in FIG. 10 includes a structured light depth engine 141, a structured light depth engine 142, a stereo depth engine 143, and a depth fusion engine 144. Based on the design needs, relevant functions of the structured light depth engine 141, the structured light depth engine 142, the stereo depth engine 143, and/or the depth fusion engine 144 may be implemented in the form of hardware, firmware, and/or software. For example, the structured light depth engine 141, the structured light depth engine 142, the stereo depth engine 143, and the depth fission engine 144 may be four different arithmetic circuits.

The structured light depth engine 141 of the image processing circuit 140 may compare the first image 121 with a ground truth pattern GTP associated with the projection pattern PP to obtain the depth map DM1. The ground truth pattern is already well-known, so no further details will be reiterated in the following. The structured light depth engine 142 of the image processing circuit 140 may compare the image 131 with the ground truth pattern GTP to obtain the depth map DM2. According to the design needs, the structured light depth engine 141 and/or the structured light depth engine 142 may calculate the depth map DM1 and/or the depth map DM2 according to the conventional structured light depth algorithm or other algorithms. Therefore, details about the conventional structured light depth algorithm will not be reiterated in the following.

The stereo depth engine 143 of the image processing circuit 140 may obtain a stereo depth map DM3 according to the image 121 and the image 131. According to the design needs, the stereo depth engine 143 may calculate the stereo depth map DM3 according to the conventional stereo depth map or other algorithms. Details about the conventional stereo depth algorithm will not be reiterated in the following. The depth fusion engine 144 of the image processing circuit 140 may merge the depth maps DM1 and DM2 and the stereo depth map DM3 to generate the final depth map FDM.

In view of the foregoing, the DoE 111 of the projector 110 according to the embodiments of the invention includes multiple projection style regions, and the rays of the light source module 112 may selectively pass through one (or more) of the projection style regions and generate the projection pattern PP. In other words, the same projector 110 can selectively provide projection patterns with different projection styles, so as to be adaptable to different applications. Therefore, the depth sensing apparatus 100 of the embodiments can selectively provide projection patterns of different projection styles based on different applications.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A depth sensing apparatus, comprising:
  a projector, comprising a diffraction optical element and a light source module, wherein the diffraction optical element comprises a plurality of projection style regions disposed on a single plane which is perpen- dicular to an optical axis of the light source module, one of rays of the light source module selectively pass through one of the projection style regions to generate a projection pattern, and the projection pattern is projected to a field; and wherein the projector further comprises a dynamic light shielding element, disposed between the diffraction optical element and the light source module, wherein the dynamic light shielding element has a plurality of light shielding regions respectively corresponding to the projection style regions, each of the light shielding regions is controlled to be in a light shielding state or in a light guiding state to selectively allow the rays of the light source module to irradiate the corresponding projection style region;

a first camera, shooting the projection pattern projected to the field to obtain a first image;

a second camera, shooting the projection pattern projected to the field to obtain a second image; and an image processing circuit, coupled to the projector, the first camera, and the second camera, wherein the image processing circuit processes the first image to obtain a first depth map, the image processing circuit processes the second image to obtain a second depth map, and the image processing circuit at least merges the first depth map and the second depth map to generate a final depth map of the field.

2. The depth sensing apparatus as claimed in claim 1, wherein the image processing circuit compares the first image with a ground truth pattern associated with the projection pattern to obtain the first depth map, and the image processing circuit compares the second image with the ground truth pattern to obtain the second depth map.

3. The depth sensing apparatus as claimed in claim 1, wherein the image processing circuit further obtains a stereo depth map according to the first image and the second image, and the image processing circuit merges the first depth map, the second depth map, and the stereo depth map to generate the final depth map.

4. The depth sensing apparatus as claimed in claim 1, wherein one of the first camera and the second camera has an infrared image sensor, a red-green-blue image sensor, or a time-of-fly sensor.

5. The depth sensing apparatus as claimed in claim 1, wherein the projection style regions comprise a texture-type region, a dot-type region, a diffuser-type region, or a ray-type region.

6. The depth sensing apparatus as claimed in claim 1, wherein the dynamic light shielding element comprises a liquid crystal panel.

7. A depth sensing apparatus, comprising:

a projector, comprising a diffraction optical element and a light source module, wherein the diffraction optical element comprises a plurality of projection style regions disposed on a single plane which is perpendicular to an optical axis of the light source module, one of rays of the light source module selectively pass through one of the projection style regions to generate a projection pattern, and the projection pattern is projected to a field; and wherein the projector further comprises a dynamic light shielding element, disposed between the diffraction optical element and the light source module, wherein the dynamic light shielding element has a plurality of light shielding regions respectively corresponding to the projection style regions, each of the light shielding regions is controlled to be in a light shielding state or in a light guiding state to selectively allow the rays of the light source module to irradiate the corresponding projection style region;

a first camera, shooting the projection pattern projected to the field to obtain a first image;

a second camera, shooting the projection pattern projected to the field to obtain a second image; and an image processing circuit, coupled to the projector, the first camera, and the second camera, wherein the image processing circuit processes the first image to obtain a first depth map, the image processing circuit processes the second image to obtain a second depth map, and the image processing circuit at least merges the first depth map and the second depth map to generate a final depth map of the field, wherein the light source module comprises a plurality of light sources, the light sources are matched with the projection style regions in a one-to-one manner, and one or more of the light sources are selectively lit up to allow the rays of the light source module to selectively pass through at least one of the projection style regions.

* * * * *